Patented May 15, 1945

2,376,244

UNITED STATES PATENT OFFICE 2,376,244

POLYMERIZATION MOLD

Richard D. Freeman, Midland, Mich., and Gordon P. Schmelter, Plainfield, N. J., assignors to The Dow Chemical Company, Midland, Mich., a corporation of Michigan No Drawing. Application November 21, 1942, Serial No. 466,484

3 Claims. (Cl. 18—47)

This invention concerns molds suitable for the polymerization of resin-forming liquids.

The preparation of molded objects from synthetic resins by introducing a resin-forming liquid into a mold and polymerizing it in place is a well-known procedure. From a practical viewpoint, however, the process has been limited to the production of simple shapes, since it has been necessary to conduct the polymerization in metal molds, and these cannot be made in intricate designs without prohibitive expense. The use of molds formed of relatively porous temporary molding materials such as plaster, which are adapted to the ready fabrication of molds of irregular or complex shapes, has actually been out of the question because of the extreme tendency of the resinous products to stick to the mold surfaces. No method of overcoming this difficulty has been known and as a result the fabrication of complicated resinous objects by simple means has remained an unrealized goal.

It has now been found, however, that sticking of polymerized resins in molds formed of plaster and like porous materials is readily and effectively prevented by coating the inner surfaces of the mold prior to polymerization with a film of a water-soluble cellulose derivative insoluble in the resin-forming material. The film thus applied does not interfere with the polymerization itself but effectively seals or bridges over the pores of the mold and prevents entry of the polymerizable liquid into these pores, thus insuring formation of a smooth surface on the object and facilitating its removal from the mold.

The porous molds to which the process of the invention is applied may be formed of any of the temporary molding materials conventionally used in casting metals, such as plaster of Paris, fine molding sand, bentonite mixtures, and the like. Cementitious materials such as plaster are ordinarily preferred because of the particular ease with which the molds can be prepared.

In practice, in preparing synthetic resinous objects, before each polymerization the inner surfaces of the mold are coated, as by dipping, spraying, etc., with a solution of the water-soluble cellulose derivative in any suitable solvent, preferably water, after which the mold is allowed to dry. The polymerizable liquid is then poured into the mold and the mold and contents subjected to polymerizing conditions, in accordance with known practice. When polymerization is complete, the solid resinous object is easily removed from the mold. In general, the cellulose derivative film has no tendency to stick to the molded resinous object. However, if any of the film should cling to the molded piece, it may be removed by a simple buffing operation, or, more conveniently, by simply washing in water. Among the water-soluble cellulose derivatives which may be used, the water-soluble cellulose ethers, particularly methyl cellulose and the water-soluble salts of cellulose glycolic acid, such as sodium cellulose glycolate and ammonium cellulose gycolate, are to be preferred.

The use of water-soluble cellulose derivatives according to the invention is greatly superior to the use of water-soluble natural gums, starch, dextrins, glues, etc. or to conventional lacquers or shellacs as mold coatings. These latter materials form only discontinuous or weak films on the mold surfaces and are entirely ineffective in eliminating sticking of the molded object.

So far as is known, the use of water-soluble cellulose derivatives as mold coatings is applicable to the polymerization in porous molds of any resin-forming material which can be polymerized to a solid product. It is of particular value in the polymerization of styrene and other polymerizable vinyl compounds, such as vinyl chloride, vinyl acetate, esters of acrylic and methacrylic acid, and so forth. The polymerizable compound is employed in liquid form either as the monomeric material or as a partially polymerized product.

The following example will illustrate the invention.

Example

A plaster mold to be used for forming a cast of a human head was coated on the inside with a 5 per cent aqueous solution of methyl cellulose and allowed to dry. The treated mold was filled with a syrupy solution of partially polymerized styrene containing about 60 per cent polymer, and then heated at a temperature of 90° C. for 5 days. At the end of this time the mold was transferred to an annealing chamber where it was allowed to cool gradually. After complete cooling, the mold was opened without any sticking of the polystyrene to the walls. The casting possessed a perfectly smooth surface and excellent definition.

It is to be understood that the foregoing description is illustrative rather than strictly limitative, and that the invention is co-extensive in scope with the following claims.

We claim:

1. A mold for the preparation of a synthetic resinous object by the polymerization of a resin-forming liquid comprising a plaster body having a mold cavity therein, the surfaces of the cavity being coated with a film of a substance selected from the class consisting of water-soluble methyl cellulose and water-soluble salts of carboxy methyl cellulose.

2. A mold for the preparation of a synthetic resinous object by the polymerization of a resin-forming liquid comprising a plaster body having a mold cavity therein, the surfaces of the cavity being coated with a film of water-soluble methyl cellulose.

3. A mold for the preparation of a synthetic resinous object by the polymerization of a resin-forming liquid comprising a plaster body having a mold cavity therein, the surfaces of the cavity being coated with a film of a water-soluble salt of carboxy methyl cellulose.

RICHARD D. FREEMAN.
GORDON P. SCHMELTER.